US005457807A

United States Patent [19]

Weinblatt

[11] Patent Number: 5,457,807

[45] Date of Patent: Oct. 10, 1995

[54] TECHNIQUE FOR SURVEYING A RADIO OR A TELEVISION AUDIENCE

[76] Inventor: Lee S. Weinblatt, 797 Winthrop Rd., Teaneck, N.J. 07666

[21] Appl. No.: 215,176

[22] Filed: Mar. 21, 1994

[51] Int. Cl.$^{6}$ .................. H04N 7/00

[52] U.S. Cl. .................. 455/2; 348/1; 348/2; 379/99; 379/110; 379/355; 379/444

[58] Field of Search .................. 348/1, 2; 455/2; 379/444, 355, 110, 99, 201; H04N 7/00

[56] References Cited

U.S. PATENT DOCUMENTS

| | | | |
|---|---|---|---|
| 3,800,223 | 3/1974 | Mead | 348/1 |
| 4,618,995 | 10/1986 | Kemp | 455/2 |
| 4,695,879 | 9/1987 | Weinblatt . | |
| 4,718,106 | 1/1988 | Weinblatt . | |
| 4,847,685 | 7/1989 | Gall et al. | 455/2 |
| 4,876,736 | 10/1989 | Kiewit . | |
| 4,885,632 | 12/1989 | Mabey et al. | 455/2 |
| 4,907,079 | 3/1990 | Turner et al. . | |
| 4,930,011 | 5/1990 | Kiewit . | |
| 4,943,963 | 7/1990 | Waechter et al. . | |
| 4,955,070 | 9/1990 | Welsh et al. . | |
| 5,023,929 | 6/1991 | Call . | |
| 5,034,902 | 7/1991 | Steinmann . | |
| 5,235,414 | 8/1993 | Cohen . | |
| 5,278,988 | 1/1994 | Dejean et al. . | |

FOREIGN PATENT DOCUMENTS

| | | | |
|---|---|---|---|
| 1536414 | 12/1975 | Australia | 455/2 |

*Primary Examiner*—James J. Groody
*Assistant Examiner*—Nina N. West
*Attorney, Agent, or Firm*—Frishauf, Holtz, Goodman, Langer & Chick

[57] ABSTRACT

A surveying technique transmits a combined signal made up of a programming signal and a survey signal, both of which are acoustically reproduced by a speaker in the audible range. The survey signal is uniquely coded to identify a signal source such as a radio station or television channel. At the receiver, the acoustic survey signal is controlled so as not to be heard at an appreciable distance from the speaker, and is converted to a non-acoustic signal. The converted non-acoustic signal is transmitted for detection by a portable unit worn by a person being monitored for his listening and/or viewing habits. The detection of the converted survey signal by the portable unit identifies the signal source to which the person was tuned. The conversion avoids the possibility of disturbing the monitored individual by the acoustic survey signal.

16 Claims, 2 Drawing Sheets

TECHNIQUE FOR SURVEYING A RADIO OR A TELEVISION AUDIENCE

BACKGROUND OF THE INVENTION

This invention is directed to a surveying technique for determining whether a monitored individual carrying a monitoring device is tuned to a given signal source such as a television channel or radio station and, in particular, to the transmission of a survey signal combined with a programming signal which are applied at the receiver so as to produce signals in the audible frequency range with a speaker, the survey signal being converted at the receiver to a non-acoustic signal that is transmitted for detection by the monitoring device to thereby identify the signal source to which the individual is tuned.

It is important for a number of reasons to survey an audience to determine to what extent each of its members is tuned at any given time to a particular source of programming (referred to herein as a "signal source") such as a television ("TV") channel or radio station, including the capability to identify even a specific program and/or a specific advertisement. The use herein of the term TV channel or radio station is to be understood as referring to all signal sources. Advertisers are, of course, interested in knowing the number of people exposed to their commercials and to identify their listeners by economic and social categories. Broadcasters use statistics on audience size and type for setting their advertising rates.

Prior art techniques for obtaining such information involve primarily the following approaches. People within the range of the radio station or who receive a television channel (either over the air or by cable) are contacted by phone and interviewed regarding their listening habits. Each person is questioned about the signal sources which that individual listened to during the previous, say, twenty-four hours. However, this technique is suspect because it is subject to recall errors as well as possible bias introduced by the interviewer. For example, if a specific signal source is mentioned to the person being interviewed, the suggestion may elicit a positive response to a question regarding whether that signal source was viewed even when it actually did not occur. Another technique involves keeping diaries by persons agreeing to act as test subjects. Diary entries are to be made manually throughout the day to keep track of what signal sources are being listened to. The diaries are collected periodically and analyzed. However, this approach is prone to inaccuracies because the test subjects may fail to make entries due to forgetfulness or laziness, or wrong entries can be made due to tardiness in attending to this task. Thus, it can be readily seen that the recall-dependent approach first described above is unsatisfactory because people may not accurately remember what they listened to at any particular time and, also, because of the potential problem of suggestive bias. The diary-based approach is likewise unsatisfactory because people may not cooperate and be as meticulous in making timely diary entries as required to obtain the desired record-keeping accuracy.

The above-described techniques all require a significant and time-consuming effort on the part of the test participants to record their TV viewing and/or radio listening habits. Other techniques are known in which the test participants need only play a passive role. For example, it is known to utilize a survey signal transmitted in combination with a programming signal for producing survey signals in the audible range. As disclosed in U.S. Pat. No. 4,718,106, the periodically transmitted survey signal is detected by a receiver and reproduced audibly by a speaker in the form of an audible signal, or code. It is "audible" by virtue of being in what is known as the audible frequency range of human hearing. More specifically, the speaker produces pressure waves in the air that can be detected by a microphone, for example, and with a frequency that is in what is scientifically regarded as the audible range of human hearing. Such pressure waves, or signals, are sometimes referred to herein as acoustic. An acoustic wave is regarded as being audible irrespective of whether it is actually heard by a person, as long as it can be produced by a conventional speaker and detected by a conventional microphone. The audible acoustic signal is detected by a portable device worn by the monitored individual, and data on the incidence of occurrence and/or the time of occurrence are stored and analyzed.

The survey signal can be transmitted at a point in time assigned to it alone, i.e. during a gap in the programming signal. This could be done at predetermined regular intervals, when the program has a natural break in it, or when it ends. Alternatively, the survey signal can be transmitted simultaneously with the programming signal. For example, as disclosed in U.S. Ser. No. 08/003,325 filed Jan. 12, 1993, a notch filter can remove a narrow band of frequencies from the programming signal, and this band is devoted to the survey signal. Corresponding filtering is then carried out by the receiver. This applies to analog signals. However, the programming and survey signals can likewise be digital. The nature of the survey signal can be such as to be heard by the monitored individual as, for example, a multi-note musical tone, or an effort can be made to lower the volume and/or transmit at the extremes of the audible frequency range so as to avoid as much as possible its being heard.

Use of the speaker to reproduce the survey signal is highly useful in many respects. However, the necessity to reproduce the transmitted survey signal audibly for pick-up by a microphone is also a possible drawback of this technique because, if heard by the listener, the sound can tend to be disturbing depending on volume, frequency of occurrence and content. In order to provide meaningful survey results, an interval of, for example, ten minutes can be set between survey signals. For some purposes, such as to take into account frequent switching among channels, for example, an interval of a minute or less may be needed. This can cause a chopping or interruption of, for example, a musical program at an inappropriate point, and some people can become annoyed just by virtue of this code being repeatedly reproduced within their hearing.

A further complicating factor is that a minimal survey signal amplitude is required in order for the portable monitoring device to be able to pick up the survey signal produced by the speaker. However, what this amplitude must be depends on the distance of the monitored individual from the speaker. If there are several TV sets in the house, due to differences in seating arrangements which normally vary from room to room, the distance between the monitored individual and the TV set is not a constant number. It is difficult to set the amplitude even within a given room, if a number of individuals are being monitored in the same household, as is common, because different seats are used by the individuals which can vary significantly in distance from the TV set, for example, depending on room size. Thus, the amplitude of the survey signal adjusted based on this factor to be minimal, yet detectable, for one room or individual would not work for all possible situations and arrangements. Therefore, at least some of the monitored individuals may hear the audible survey signal if, for example, the amplitude is set for distance X while they sit at X/2.

In view of the above, it is preferable to avoid use of a survey signal which might be discerned by the monitored individual. However, government regulations in some countries may require that signals for commercial radios, for example, must be limited to the audible range. In fact, even though speakers which are now available can reproduce frequencies beyond the audible range of a human being, nevertheless the usable transmission frequencies permitted by government regulations are limited to the audible range because of the need for compatibility with older, lower quality speakers. Thus, there exists a conflict between the respective requirements at the transmission end and the receiving end. At the transmission end, there is the need to transmit a survey signal in the audible frequency range, while at the receiving end it is preferable to reproduce the survey signal so as not to disturb the monitored individuals.

Although the technique disclosed in U.S. Pat. No. 4,718,106 is highly useful in terms of carrying out passive monitoring, it has several additional shortcomings. For example, it cannot monitor signal sources that are listened to on a Walkman type of device, which relies on headphones and has no speaker, or with headphones plugged into a radio or TV set which cut-out the speaker because in either case an acoustic signal is not projected far enough to be detected by the device worn by the monitored individual. Also, the technique disclosed in that patent is vulnerable to fraud because false readings can be created in the device if, for example, someone were to set up a bogus signal source emitting a monitoring signal of interest (say for a particular TV program) in a shopping mall. All consumers wearing the monitoring device who happen to be merely shopping in the mall would then register the monitoring signal, and be recorded as viewers, even though they obviously are not.

SUMMARY OF THE INVENTION

One object of the present invention is to provide an improved audience survey technique utilizing a transmitted survey signal which is used to identify the signal source to which a monitored individual is tuned.

It is another object of the present invention to transmit a survey signal in the audible range to be reproduced at the receiver by a speaker but to reproduce it as a signal which is non-intrusive to the monitored individual.

A further object of the present invention is to provide data security to information collected with an audience surveying technique to prevent fraud.

Yet another object of the present invention is to survey an audience even with monitored individuals who are using headphones.

These and other objects are attained in accordance with one aspect of the present invention which is directed to an apparatus for surveying an audience to determine whether a person is tuned to a given signal source, such as a radio station or a television channel, which is transmitting a programming signal along with a survey signal characteristic of said signal source, the programming signal and the survey signal being in a frequency range to be audibly reproduced by a speaker in a receiver unit. The apparatus includes transmission means for combining the programming signal and the survey signal for transmission thereof as a combined signal. A receiving means receives the transmitted combined signal, and a speaker is responsive to the received combined signal to produce the survey signal as an acoustic signal, the survey signal being such that when reproduced by the speaker, the acoustic signal cannot be heard at an appreciable distance from the speaker. A conversion means converts the acoustic survey signal produced by the speaker to a non-acoustic converted signal. The converted signal is transmitted for detection by a detection means as being indicative of the signal source.

Another aspect of the invention is directed to an apparatus for surveying an audience to determine whether a person is tuned to a given signal source, such as a radio station or television channel, which is transmitting a combined signal that combines both a programming signal and a survey signal characteristic of the signal source, the programming signal and the survey signal being in a frequency range to be audibly reproduced by a speaker in a receiver unit. The apparatus includes receiving means for receiving the combined signal and a speaker for reproducing the survey signal as an acoustic signal, the survey signal being such that when reproduced by the speaker, the acoustic signal cannot be heard at an appreciable distance from the speaker. A conversion means converts the acoustic survey signal produced by the speaker to a non-acoustic converted signal. The converted signal is transmitted for detection by a detecting means for detecting the transmitted converted signal as being indicative of the signal source.

A further aspect of the present invention is directed to an apparatus for surveying an audience to determine whether a person listening with headphones is tuned to a given signal source, such as a radio station or a television channel, which is transmitting a programming signal along with a survey signal characteristic of the signal source, the programming signal and the survey signal being in a frequency range to be audibly reproduced by a speaker and/or headphones coupled to a receiver. The apparatus includes transmission means for combining the programming signal and the survey signal for transmission thereof as a combined signal. A receiving means receives the transmitted combined signal and provides the combined signal at a jack for input to the headphones. A conversion unit is provided with a jack and a plug, the plug being received in the jack of the receiving means, and the plug of the conversion unit being adapted to receive a plug of the headphones. The conversion unit includes means for reproducing the survey signal from the combined signal to generate an output signal, and means for transmitting a signal corresponding to the output signal. The transmitted output signal is detected as being indicative of the signal source.

Yet another aspect of the present invention is directed to a method for surveying an audience to determine whether a person is tuned to a given signal source, such as a radio station or a television channel, which is transmitting a programming signal along with a survey signal characteristic of the signal source, the programming signal and the survey signal being in a frequency range to be audibly reproduced by a speaker in a receiver unit. The method includes the steps of combining the programming signal and the survey signal to generate a combined signal, and transmitting said combined signal. The transmitted combined signal is received, and producing therefrom the survey signal as an acoustic signal with a speaker. The survey signal is such that when reproduced by the speaker, the acoustic signal cannot be heard at an appreciable distance from the speaker. The acoustic survey signal produced by the speaker is converted to a non-acoustic converted signal, and transmitting the converted signal. Then, detecting the transmitted converted signal as being indicative of the signal source.

A still further aspect of the present invention is directed to a method for surveying an audience to determine whether a person is tuned to a given signal source, such as a radio station or television channel, which is transmitting a combined signal that combines both a programming signal and a survey signal characteristic of the signal source, the programming signal and the survey signal being in a frequency range to be audibly reproduced by a speaker in a receiver unit. The method includes the steps of receiving the combined signal and reproducing the survey signal as an acoustic signal with a speaker. The survey signal is such that when reproduced by the speaker, the acoustic signal cannot be heard at an appreciable distance from the speaker. The acoustic survey signal produced by the speaker is converted to a non-acoustic converted signal, and transmitting the converted signal. Then, detecting the transmitted converted signal as being indicative of the signal source.

DETAILED DESCRIPTION OF THE INVENTION

To conduct the survey, persons are selected by the surveying organization based on certain criteria. These criteria can be, for example, age, income, geographic location, sex, and level of education. The broadcasting organization and/or advertisers may require an analysis of their listeners which is broken down into one or more of these categories. The individuals who are approached to be test subjects are merely asked to participate in a test the details of which are not explained. Each person is told only that a requirement of the test is the wearing of a certain article of clothing. Additional information is preferably not supplied in order to avoid predisposing or prejudicing the individual test subject toward or away from the aims of the survey. For example, if the individual were told that the survey relates to a radio survey, then this might result in more time and attention being paid to radio listening than would be normal for that person. Even worse would be the situation were the individual informed of the particular radio station involved in the survey. In order to avoid this problem, each individual is given an article of clothing to wear on a regular basis. For example, such an article of clothing might be a watch for men or a bracelet for women.

Figure 1:
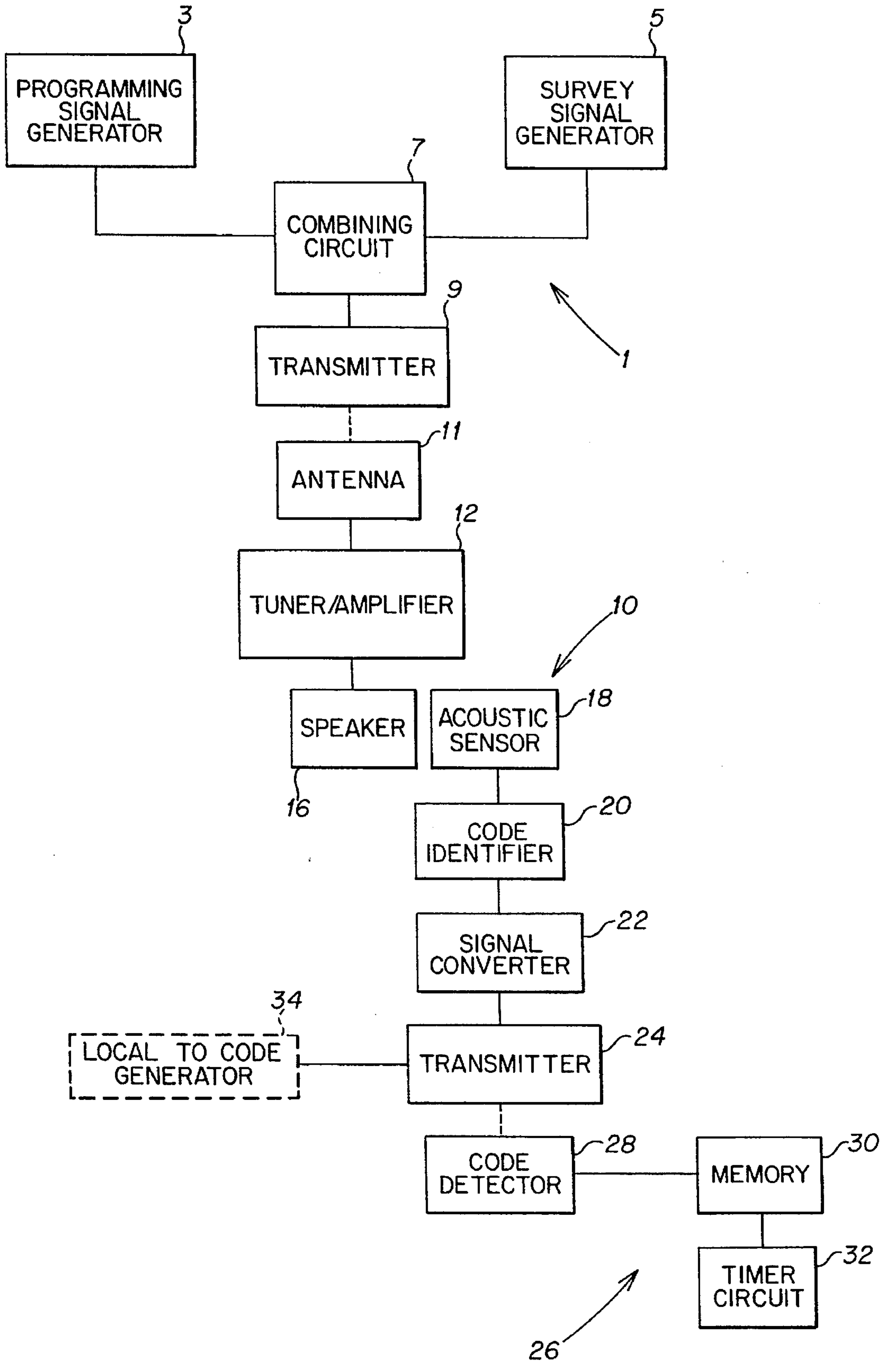
FIG. 1 is a block diagram of a circuit in accordance with the invention.

FIG. 1 depicts in block form a signal source 1 for emitting frequency signals at one of the frequencies to which radios are tunable on either the AM or FM band or on which television channels transmit. In both cases, the frequencies used are in the range for producing at the receiving end audible signals normally to be converted by a speaker into acoustic signals in the form of pressure waves traveling through the air. Signal source 1 includes a programming signal generator 3 and a survey signal generator 5. Generator 3 can include a microphone picking up a live performance or a tape of some pre-recorded program. Generator 5 is likely to be a taped coded signal and, for example, it can be operated on a timer with a preset interval between playbacks or it can be operated with a switch selectively actuated manually. The outputs of generators 3 and 5 are added in combining circuit 7, and then provided to transmitter 9. As explained above, generators 3 and 5 can produce analog or digital signals and the programming signal and survey signal can overlap in time or they can occur at times distinct from each other. Also, the survey signal can be transmitted in relation to only a specific program or a specific commercial, that being the signal source, rather than the radio station or TV channel as such. Details of all such elements 3, 5, 7 and 9 are well known in the art. Accordingly, it is not deemed necessary to provide the circuit and structural specifics of this transmitting means nor any other such details connected with a signal source, except as follows.

Generator 5 produces a coded survey signal utilized for a purpose to be described below in greater detail. Suffice it to say at this point that generator 5 produces a modulating signal transmitted on the carrier airwave emitted by transmitter 9 so as to be detectable by a receiver which is tuned to the frequency of the particular signal source of interest. The coded survey signal is emitted at preselected time intervals, as discussed below in further detail. Its most significant feature lies in its code being unique to a particular signal source. Its transmission, reception and subsequent playback by a speaker characterize a receiver as being tuned to that particular signal source. More specifically, the code can identify the TV channel. Programming and/or commercials broadcast by the TV channel can be determined by combining the TV channel identity with time stamp information. Alternatively, the code can identify a particular program or commercial. This makes the identification possible independent of a time factor, such as when the program is being replayed by a VCR. The words "transmit" and "broadcast" as used herein refer generically to all methods for providing a signal to a receiver of a TV set or a radio set for reproduction by video and/or sound to the individual. For example, transmitter 9 broadcasts its signal over the airwaves in a standard fashion. These signals are picked up by a conventional receiver 10 having antenna 11, tuner/amplifier 12 and speaker 16. If the tuner/amplifier 12 is tuned to the signal source of interest, then the signals broadcast by transmitter 9 will be reproduced by the speaker 16.

Up to this point, the description of receiver 10 has involved only well known components in widespread use. To implement the objects of the invention, further circuitry is required. The further circuitry will now be described as part of receiver 10 in the sense that it is in the same enclosure (not shown) and in close proximity to speaker 16.

Acoustic sensor 18 is placed at speaker 16. The acoustic sensor 18 picks up vibrations of the speaker either by direct contact or through a small air gap. More specifically, acoustic sensor 18 can be mounted on speaker 16 to directly sense such vibrations. Alternatively, acoustic sensor 18 can be positioned very close to speaker 16, but not in contact with it, to detect pressure waves created in the air gap therebetween. In both cases, acoustic sensor 18 will be responsive to pressure waves generated by vibrations of speaker 16 in response to the survey signal even though the amplitude, or volume, of the transmitted survey signal is set to be low so as to ensure that it will not be heard. Thus, the amplitude of the survey signal is controlled so that when reproduced by the speaker 16, the volume is at a level low enough and/or the frequency is such that it cannot possibly be heard by a human being at any appreciable distance beyond the enclosure. The term "appreciable distance" applies to approximately one foot from the enclosure.

Acoustic sensor 18 can be of a type which reproduces all vibrations it senses from speaker 16, including those due to a programming signal, and produces a corresponding electrical signal. However, for purposes of the survey, only the coded survey signal is significant. Therefore, the electrical output of acoustic sensor 18 is passed through code identifier 20. For example, this component can be a notch filter to monitor a narrow band of frequencies restricted for use by the survey signal, or it can be a comparator which compares, in analog or digital form, the output of acoustic sensor 18 against a preselected reference signal. Code identifier 20 blocks passage of signals to its output unless its input signal matches with a preselected reference signal. When the coded survey signal is so matched, it is provided to signal converter 22. This circuit processes the signal at the output of acoustic sensor 18 to produce a non-acoustic signal for transmission by transmitter 24. The output of transmitter 24 can be, for example, electrical in which case signal converter 22 need do none or just minimal conversion because it receives what is already an electrical signal from code identifier 20. However, if transmitter 24 is optical or otherwise, then a suitable conversion is required. Such conversion circuits are well known in the art and, therefore, details thereof are not deemed necessary.

A variation of the above combines components 18 and 20 into one. More specifically, acoustic sensor 18 can be designed so as to respond only to a specific preselected code. For example, the acoustic sensor 18 can be designed to reproduce only vibrations which are within a certain narrow band of frequencies. This feature can be used to reproduce only the coded survey signal. With this embodiment, the output signal of acoustic sensor 18/code identifier 20 is acoustic rather than electrical. Therefore, signal converter 22 must be of the type that converts such an acoustic signal at its input to one suitable for transmitter 24, which, for example, is electrical.

Briefly, the above-described circuitry of receiver 10 has converted the acoustic output of the survey signal from speaker 16 to a non-acoustic signal which is emitted from the enclosure (not shown) by transmitter 24. This is accomplished while maintaining the volume of the acoustic survey signal reproduced by speaker 16 at such a low level that it can be detected by acoustic sensor 18 positioned at speaker 16, but not much, if at all, beyond the enclosure. Therefore, the advantages of using a transmitted survey signal in the audible range is retained while distractions and annoyance to the monitored individual at the receiver end are avoided.

A portable signal detector 26 is shown in the drawing as including a code detector 28. Code detector 28 includes a device for responding to the signal emitted by transmitter 24 as well as circuitry for processing the detected signal. More specifically, if transmitter 24 generates an electrical signal (as opposed to another type of signal discussed below), that electrical signal is compared by the circuitry in code detector 28 against a preselected code or codes related to the survey of interest. If the received code matches a stored code, then code detector 28 provides an output signal to memory 30 which stores it as an indication that an incidence of the individual being tuned to a given signal source of interest has been detected. Optionally, a date stamp can be provided by also storing the output of a time circuit 32 in memory 30 together with this incidence signal so that not only the incidence is recorded, but also the time when it occurred. The subject matter of U.S. Pat. No. 4,718,106 is hereby incorporated by reference in connection with the circuitry and operation of code detector 28, memory 30 and time circuit 32 (respectively identified in such patent as detection circuit 11, memory 13 and time circuit 15).

Portable signal detector unit 26 can be accommodated in any small article of clothing which a person normally wears. For example, a male test subject might be given a wristwatch into which the various components 28, 30 and 32 have been installed. Timer circuit 32 is, of course, an inherent part of the watch. Many electronic watches have been developed which include a memory. Alarm-type watches include a tone producing transducer. This transducer can be replaced with a microphone to detect rather than generate acoustic signals. The remaining circuitry is implementable on a small scale and can readily be inserted into the conventional watch. For a female, the circuitry for portable signal detector unit 26 can be inserted in a bracelet, a decorative pin, or a necklace pendant.

The information stored in memory 30 can be retrieved in one of several ways. For example, the portable signal detector unit 26 can be physically collected at, say, monthly intervals and taken to a central office. The contents of memory 30 are then dumped into another suitable memory in the central office from where it can be sorted, processed and analyzed as needed. In the alternative, unit 26 (say, a watch) could be placed nightly into a docking station (not shown) which is accessible by a phone line from the central office. The unit 26 can then be accessed by the central station to retrieve the stored data and carry out other operations, such as resetting the memory.

Information obtained in the above-described manner will indicate to what extent the test subjects were tuned to the particular TV channel or radio station of interest. Only a passive wearing of the article is required. If unit 26 picks up signals from receiver 10, this means that the test subject is close to the receiver and is likely to be listening to the radio or watching television. No deliberate action whatsoever on the part of any individual acting as a test subject is required in order to record the event. Moreover, no skewing of the test results can occur due to any suggestions because these individuals need not be informed about the purpose of the test. They are merely given the article of clothing and are asked to wear it. No more needs to be said. Consequently, the test is completely accurate in terms of fully recording one's radio listening and/or television watching habits, and the test is conducted under natural, real-life conditions.

This technique can also provide valuable information about the type of person listening in. It lends itself to careful selection of the test subjects in terms of, for example, income, education, family size, etc. Information available about such test subject can be combined with the stored tuning habits information so that the resulting data can be analyzed together and refined into various categories of listeners.

If the time of day is recorded when a stored signal is generated, an analysis can be made for the benefit of the advertiser. That time can be correlated against the time when a given commercial was broadcast. Statistics can, therefore, be provided regarding the size of the audience to which the commercial was exposed. Such time information is also valuable to the broadcasters because it reveals the popularity of the shows put on the air by that station. This information can be used to set advertising rates as well as to rearrange the programming as necessary.

As has been mentioned above, the surveying technique is to some extent vulnerable to fraud. For example, a transmitter can be set up in a heavily trafficked area which will transmit the survey signal. All individuals who are participating in the survey that pass within range of this bogus transmitter will register an incidence even though they are not tuned to the registered signal source. In order to avoid such an occurrence, receiver 10 can be provided with a local identification ("ID") code generator 34. It is shown as a box delineated by broken lines which indicates that inclusion of generator 34 is optional. Each transmitter 24 is assigned a unique ID code. This code is added by transmitter 24 to the coded survey signal provided to transmitter 24 by signal converter 22. The ID code can be positioned before or after the coded survey signal as a matter of design choice. If a generator 34 is used, then transmitter 24 must be suitably revised to include circuitry for combining the two coded signals. The specific circuit implementation is well within the knowledge and capacity of one ordinarily skilled in the art and, therefore, no details are deemed necessary.

Code detector 28 must also be revised to be capable of identifying the local ID codes, and memory 30 must be able commensurately to store the local ID code along with its associated coded survey signal.

Several advantages are gained from use of generator 34. First, if the bogus transmitter does not produce an ID code, then all incidences stored in memory 30 without an associated local ID code are simply discarded. Also, the central station which processes all, or at least much, of the data from individuals participating in the survey can be readily programmed to output the number of devices associated with a particular ID code. Normally, each local ID code should appear in data collected from only a relatively few devices, namely from members of the household and its visitors. However, a bogus transmitter will produce readings in a significantly higher number of devices. Thus, all data associated with a local ID code which appears on an abnormally high number of devices will be discarded. This approach will insure the integrity of the survey results.

An additional advantage stemming from the use of generator 34 is the capacity to gather additional useful information on the behavior of the individuals participating in the survey. More specifically, each TV set and radio in the house is assigned its own unique ID code. Therefore, from the detected ID code it is possible to know where the individual was when the survey signal was detected. A fine tuning of the survey results is feasible based, for example, on a rating of the level of attention and potential for recall related to whether the living room or bedroom was the site.

Figure 2:
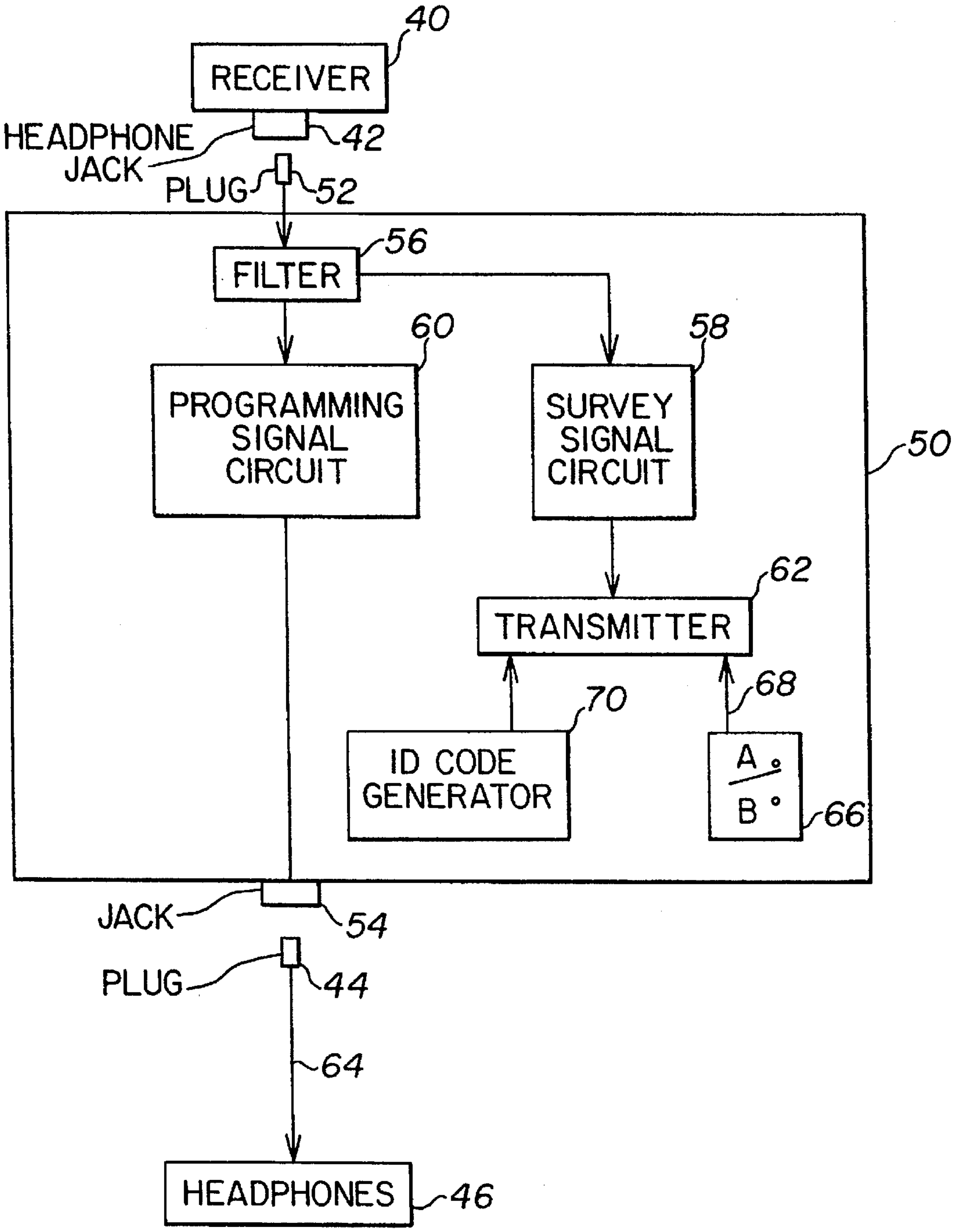
FIG. 2 is a block diagram of a circuit designed to operate in accordance with the invention to monitor individuals listening to a program with headphones.

As is readily apparent from the above, the present invention relies on having a speaker which reproduces the survey signal, albeit at a low volume. However, how will the invention handle a situation where the monitored individual is exposed to the signal source, but without resort to a speaker? For example, a personal receiver, such as the Walkman type, has no speaker and, instead, reproduces sound only via headphones. Another such situation is when the monitored individual uses the headphone input on the radio or TV set to listen with headphones. When a headphone plug is inserted into the headphone jack, the audio signal is blocked from the speaker. The solution offered by the present invention is shown in FIG. 2.

More specifically, receiver 40 is provided with a conventional headphone jack 42. Normally, plug 44 of headphones 46 would be inserted into jack 42 to activate the headphones. Receiver 40 is a conventional one which includes an antenna, tuner, and amplifier. Headphones 46, plug 44 and jack 42 are also all conventional. In accordance with the present invention, conversion unit 50 is provided which has a plug 52 at one end and jack 54 at the other end. Plug 52 is connected into jack 42, and plug 44 is connected into jack 54. With this arrangement, the signal from receiver 40 is routed to headphones 46 via unit 50.

Conversion unit 50 includes filter 56 to separate the survey signal from the programming signal. The term "filter" is used generically to refer to any way of separating the survey signal from the programming signal. In analog circuitry, the term can refer to an actual filter. In digital circuitry, the separation can be based on digit position, digit sequences, etc. Such signal separation arrangements depend on the transmission scheme used, and are well known to anyone ordinarily skilled in the art. Survey signal circuit 58 receives the separated survey signal from filter 56 and does any necessary processing to ensure that it is accurately reproduced. The separated programming signal is routed to programming signal circuit 60 which does any necessary processing to ensure that the programming signal is accurately reproduced. Only the programming signal is provided to jack 54 which routs it to headphones 46. However, the survey signal is input to transmitter 62 which can be the same as transmitter 24, described above, in terms of radiating the survey signal, which is non-acoustic, for detection by code detector 28 worn by the monitored individual.

Care is taken in the design so that the non-acoustic signal emitted by transmitter 62 is at such a low amplitude so as to radiate for a relatively small distance which corresponds to, for a Walkman unit, only three feet. This distance is adequate when one considers that transmitter 62 is connected to the Walkman unit which is carried by hand or in a belt, and the monitoring device is on the arm (i.e. a watch). Setting such a short distance will not work if unit 50 is connected to a TV set, for example. Typically, wire 64 for such headphones is longer than for a Walkman unit because the monitored individual sits further away from the TV set than the distance from a Walkman unit to the listener's arm. Thus, the unit 50 is provided with a single pole, double throw switch 66 with two contacts A and B. When contact A is engaged by the pole, a control signal is sent on line 68 which causes transmitter 62 to radiate a distance of three feet, as explained above. If unit 50 is used with a TV set, switch 66 is actuated to the B position which produces a control signal on line 68 that causes transmitter 62 to radiate the survey signal for, say, 15 feet. However, this causes a problem because, at this distance, the survey signal might be detected by the device worn by another monitored individual present in the vicinity. Such a reading would obviously be a false one since the headphones are worn by only a single individual. This problem can be handled by the following signal processing. Unit 50 is provided with local ID code generator 70 which is like generator 34 described above. When processing at the central station determines that this ID code appears on more than one device at approximately the same time (a fact known from the time stamp as described above), only one of the device readings is recognized as an incidence.

It should be apparent that although a preferred embodiment of the invention has been described above, various modifications can readily be made thereto. All such modification are intended to be included within the scope of the invention as defined by the following claims.

I claim:

1. Apparatus for surveying an audience to determine whether a person is tuned to a given signal source, which is transmitting a programming signal along with a survey signal characteristic of said signal source, the programming signal and the survey signal being in a frequency range to be audibly reproduced by a speaker in a receiver unit, comprising:

transmission means for combining the programming signal and the survey signal for transmission thereof as a combined signal;

receiving means for receiving said transmitted combined signal;

a speaker responsive to said received combined signal to produce the survey signal as an acoustic signal, said survey signal being such that when reproduced by said speaker, said acoustic signal cannot be heard at an appreciable distance from said speaker;

conversion means for converting said acoustic survey signal produced by said speaker to a non-acoustic converted signal;

means for transmitting said converted signal; and means for detecting said transmitted converted signal as being indicative of the signal source.

2. The apparatus of claim 1, wherein said conversion means comprises an acoustic sensor positioned at said speaker to produce a signal corresponding to the acoustic signal from said speaker.

3. The apparatus of claim 2, wherein said acoustic sensor is mounted on said speaker.

4. The apparatus of claim 2, wherein said acoustic sensor is spaced by a small air gap from said speaker.

5. The apparatus of claim 1, wherein said conversion means comprises means for identifying the presence of a signal corresponding to said survey signal in an output of said acoustic sensor.

6. The apparatus of claim 1, wherein said transmission means transmits said survey signal at preset intervals.

7. The apparatus of claim 1, further comprising:

an identification code generator producing an ID signal unique to said converted signal the means for transmitting; and means for combining said ID signal with said converted signal for input to said converted signal transmitting means.

8. Apparatus for surveying an audience to determine whether a person is tuned to a given signal source, which is transmitting a combined signal that combines both a programming signal and a survey signal characteristic of said signal source, said programming signal and said survey signal being in a frequency range to be audibly reproduced by a speaker in a receiver unit, comprising:

receiving means for receiving the combined signal and including a speaker for reproducing therefrom the survey signal as an acoustic signal, said survey signal being such that when reproduced by said speaker, said acoustic signal cannot be heard at an appreciable distance from said speaker;

conversion means for converting said acoustic survey signal produced by said speaker to a non-acoustic converted signal;

means for transmitting said converted signal; and means for detecting said transmitted converted signal as being indicative of the signal source.

9. The apparatus of claim 8, wherein said conversion means comprises an acoustic sensor positioned at said speaker to produce a signal corresponding to the acoustic signal from said speaker.

10. The apparatus of claim 8, wherein said acoustic sensor is spaced by a small air gap from said speaker.

11. The apparatus of claim 8, wherein said conversion means comprises means for identifying the presence of a signal corresponding to said survey signal in an output of said acoustic sensor.

12. The apparatus of claim 8, wherein said acoustic sensor is mounted on said speaker.

13. The apparatus of claim 8, further comprising:

an identification code generator producing an ID signal unique to said converted signal transmitting means; and means for combining said ID signal with said converted signal for input to said converted signal transmitting means.

14. Apparatus for surveying an audience to determine whether a person listening with headphones is tuned to a given signal source, which is transmitting a programming signal along with a survey signal characteristic of the signal source, the programming signal and the survey signal being in a frequency range to be audibly reproduced by a speaker and/or headphones coupled to a receiver, comprising:

transmission means for combining the programming signal and the survey signal for transmission thereof as a combined signal;

receiving means for receiving said transmitted combined signal and providing the combined signal at a jack for input to the headphones;

a conversion unit having a jack and a plug, said plug being received in the jack of the receiving means, and said plug of the conversion unit being adapted to receive a plug of the headphones, wherein said conversion unit includes means for reproducing said survey signal from said combined signal to generate an output signal, and means for transmitting a signal corresponding to said output signal; and means for detecting said transmitted output signal as being indicative of the signal source.

15. Method for surveying an audience to determine whether a person is tuned to a given signal source, which is transmitting a programming signal along with a survey signal characteristic of said signal source, the programming signal and the survey signal being in a frequency range to be audibly reproduced by a speaker in a receiver unit, comprising the steps of:

combining the programming signal and the survey signal to generate a combined signal, and transmitting said combined signal;

receiving said transmitted combined signal;

from the received combined signal, producing the survey signal as an acoustic signal with a speaker, said survey signal being such that when reproduced by said speaker, said acoustic signal cannot be heard at an appreciable distance from said speaker;

converting said acoustic survey signal produced by said speaker to a non-acoustic converted signal;

transmitting said converted signal; and detecting said transmitted converted signal as being indicative of the signal source.

16. Method for surveying an audience to determine whether a person is tuned to a given signal source, which is transmitting a combined signal that combines both a programming signal and a survey signal characteristic of said signal source, said programming signal and said survey signal being in a frequency range to be audibly reproduced by a speaker in a receiver unit, comprising the steps of:

receiving the combined signal and reproducing therefrom the survey signal as an acoustic signal with a speaker, said survey signal being such that when reproduced by said speaker, said acoustic signal cannot be heard at an appreciable distance from said speaker;

converting said acoustic survey signal produced by said speaker to a non-acoustic converted signal;

transmitting said converted signal; and detecting said transmitted converted signal as being indicative of the signal source.

* * * * *

Adverse Decision in Interference

Patent No. 5,457,807, Lee S. Weinblatt, TECHNIQUE FOR SURVEYING A RADIO OR A TELEVISION AUDIENCE, Interference No. 105,295, final judgment adverse to the patentees rendered September 25, 2006, as to claims 1-16.

(*Official Gazette February 13, 2007*)